United States Patent
Cha et al.

(10) Patent No.: US 9,469,233 B2
(45) Date of Patent: Oct. 18, 2016

(54) CARGO LOADING APPARATUS OF VEHICLE LUGGAGE ROOM

(71) Applicant: Hyundai Motor Company, Seoul (KR)

(72) Inventors: Dong Eun Cha, Suwon-si (KR); Hyun Gyung Kim, Hwaseong-si (KR); Seung Mok Lee, Osan-si (KR); Phil Jung Jeong, Yongin-si (KR)

(73) Assignee: Hyundai Motor Company, Seoul (KR)

( * ) Notice: Subject to any disclaimer, the term of this patent is extended or adjusted under 35 U.S.C. 154(b) by 0 days.

(21) Appl. No.: 14/458,776

(22) Filed: Aug. 13, 2014

(65) Prior Publication Data

US 2015/0165995 A1 Jun. 18, 2015

(30) Foreign Application Priority Data

Dec. 17, 2013 (KR) ........................ 10-2013-0157634

(51) Int. Cl.
*B60R 19/48* (2006.01)
*B60P 1/44* (2006.01)
*B60R 5/04* (2006.01)
*B60R 19/14* (2006.01)

(52) U.S. Cl.
CPC .................. *B60P 1/44* (2013.01); *B60R 5/041* (2013.01); *B60R 19/14* (2013.01); *B60R 19/48* (2013.01)

(58) Field of Classification Search
CPC ......... B60P 1/44; B60R 5/041; B60R 19/14; B60R 19/48
See application file for complete search history.

(56) References Cited

U.S. PATENT DOCUMENTS

| 6,955,519 B1 * | 10/2005 | Ferderber ................. B60P 3/10 114/259 |
| 2003/0141733 A1 * | 7/2003 | Burg ....................... B60R 5/041 296/26.09 |
| 2005/0140159 A1 | 6/2005 | Barber |

FOREIGN PATENT DOCUMENTS

| JP | 2003-320900 A | 11/2003 |
| KR | 20-0267912 Y1 | 2/2002 |
| KR | 10-0775358 B1 | 11/2007 |
| KR | 10-0949153 B1 | 3/2010 |
| KR | 10-2013-0036915 A | 4/2013 |

* cited by examiner

*Primary Examiner* — Glenn Dayoan
*Assistant Examiner* — Melissa A Black
(74) *Attorney, Agent, or Firm* — Morgan, Lewis & Bockius LLP

(57) ABSTRACT

A cargo loading apparatus of a vehicle luggage room may include a rail mechanism including a fixation rail fixed to a rear back beam and a movable rail that moves forward and/or rearward along the fixation rail, a pair of left and right side plates connected with the movable rail to move together with the movable rail, an upper plate in which a rear side surface is rotatably connected with the side plates through a hinge stopper to be rotatable substantially perpendicularly to the side plates and a rear end is connected with a bumper door, and a lifter installed so that one end of which is connected to a side plate of the side plates and the other end of which is connected to the upper plate, the lifter maintaining a rotational state of the upper plate while a length of the lifter is varied when the upper plate rotates upward around the hinge stopper.

7 Claims, 8 Drawing Sheets

CARGO LOADING APPARATUS OF
VEHICLE LUGGAGE ROOM

CROSS-REFERENCE TO RELATED
APPLICATION

The present application claims priority of Korean Patent Application Number 10-2013-0157634 filed on Dec. 17, 2013, the entire contents of which application are incorporated herein for all purposes by this reference.

BACKGROUND OF INVENTION

1. Field of Invention

The present invention relates to a cargo loading apparatus of a vehicle luggage room, and more particularly, to a cargo loading apparatus of a vehicle luggage room that can conveniently load a large-capacity cargo in the luggage room.

2. Description of Related Art

Vehicles which have been developed in recent years have been developed by considering a practical aspect as well as stability and fuel efficiency as one of important tasks and a storage box 2 has been developed, which is capable of storing articles using an internal space of a rear bumper 1 corresponding to an available space of a vehicle as illustrated in FIG. 1 as a part thereof.

The storage box 2 may be used by opening/closing only a bumper door 3 with being stored in the rear bumper 1 and the storage box 2 is drawn rearward from the rear bumper 1 to be used together with the bumper door 3 as necessary.

However, the storage box structure in the related art, in which the storage box 2 is stored in the rear bumper 1 to store a cargo, has a disadvantage that it is easy to store only a luggage having a small cargo and it is difficult to store a large-capacity cargo having a large volume.

In particular, in a vehicle having a large vehicle height such as vehicles for leisure (including a recreational vehicle, a sport utility vehicle, and the like), the cargo needs to be loaded in the luggage room and in the case of a large-capacity cargo having a large volume and a heavy weight, it may be difficult to load the large-capacity cargo in the luggage room by raising the large-capacity cargo only by user's force to a predetermined height.

The information disclosed in this Background section is only for enhancement of understanding of the general background of the invention and should not be taken as an acknowledgement or any form of suggestion that this information forms the prior art already known to a person skilled in the art.

SUMMARY OF INVENTION

The present invention has been made in an effort to provide a cargo loading apparatus of a vehicle luggage room that can more conveniently load a cargo at the time of loading a large-capacity cargo in the luggage room of a vehicle to improve user's convenience.

In various aspects, the present invention provides a cargo loading apparatus of a vehicle luggage room, including: a rail mechanism including a fixation rail fixed to a rear back beam and a movable rail that moves forward and/or rearward along the fixation rail, a pair of left and right side plates connected with the movable rail to move together with the movable rail, an upper plate in which a rear side surface is rotatably connected with the side plates through a hinge stopper to be rotatable substantially perpendicularly to the side plates and a rear end is connected with a bumper door, and a lifter installed so that one end of which is connected to a side plate of the side plates and the other end of which is connected to the upper plate, the lifter maintaining a rotational state of the upper plate while a length of the lifter is varied when the upper plate rotates upward around the hinge stopper.

The bumper door may be configured to be separable from the rear bumper, and to be installed coplanarly with the rear bumper at ordinary times while not loading a cargo such that the bumper door and the rear bumper collectively performs a function of the rear bumper at the ordinary times.

The movable rail, and the side plate and the upper plate may be stored in an internal space of the rear bumper when the bumper door performs a function of the rear bumper and are drawn rearward together when the bumper door is drawn rearward from the rear bumper.

The upper plate may include a rear plate connected with the bumper door, and a front plate connected with the rear plate to be slidably-movable and rotatable with respect to the rear plate. A top of the lifter may be connected to the front plate.

A joining protrusion may be provided on any one of the rear plate and the front plate and a joining groove into which the joining protrusion is inserted may be provided on the other one of the rear plate and the front plate so that the rear plate and the front plate move together when the upper plate moves for rearward drawing or forward storing, and the joining protrusion and the joining groove may be detachably engaged and joined to each other.

The front plate may move forward from the rear plate after the top of the lifter is separated from the front plate. Hinge protrusions may be provided on rear lateral surfaces of the front plate for forward and rearward movement and rotation of the front plate with respect to the rear plate, and a guide groove to which a hinge protrusion of the hinge protrusions moves in a longitudinal direction may be provided on the rear plate. A front end portion of the front plate may rotate toward the side plates around the hinge protrusions and thereafter, may be fixed to the side plates to support the rear plate.

According to the present invention, a user can load a cargo using a plate which is tilted upward after drawing the cargo rearward from a rear bumper without directly raising and loading the cargo at the time of loading a large-capacity cargo having a large volume and a heavy weight in a luggage room of a vehicle. As such, the cargo loading apparatus of the present invention significantly improves user's convenience and in particular, is useful to female drivers and seniors.

It is understood that the term "vehicle" or "vehicular" or other similar term as used herein is inclusive of motor vehicles in general such as passenger automobiles including sports utility vehicles (SUV), buses, trucks, various commercial vehicles, watercraft including a variety of boats and ships, aircraft, and the like, and includes hybrid vehicles, electric vehicles, plug-in hybrid electric vehicles, hydrogen-powered vehicles and other alternative fuel vehicles (e.g. fuels derived from resources other than petroleum). As referred to herein, a hybrid vehicle is a vehicle that has two or more sources of power, for example both gasoline-powered and electric-powered vehicles.

The methods and apparatuses of the present invention have other features and advantages which will be apparent from or are set forth in more detail in the accompanying drawings, which are incorporated herein, and the following Detailed Description, which together serve to explain certain principles of the present invention.

BRIEF DESCRIPTION OF THE DRAWINGS

The above and other features of the present invention will now be described in detail with reference to certain exemplary embodiments thereof illustrated the accompanying drawings which are given hereinbelow by way of illustration only, and thus are not limitative of the present invention, and wherein.

Figure 1:
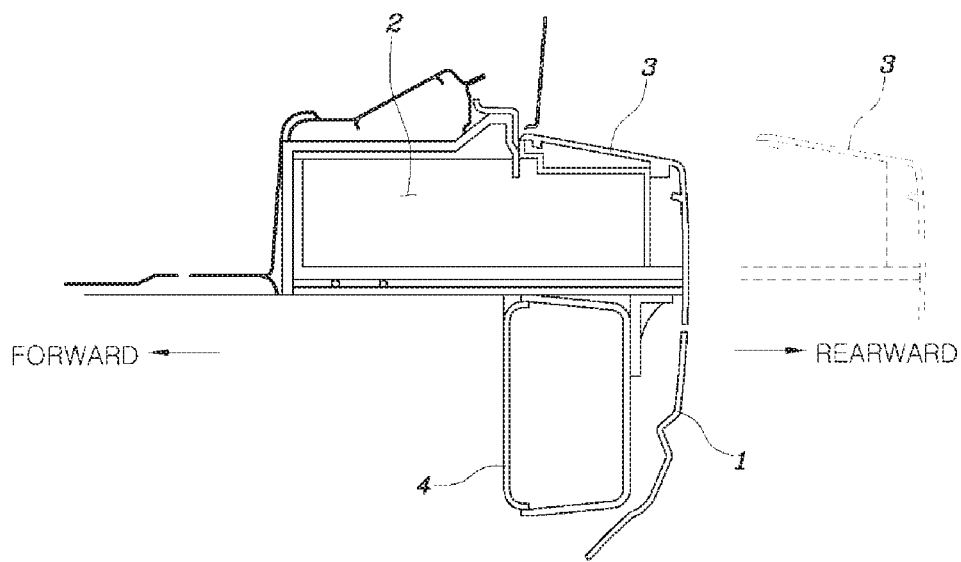
FIG. 1 is a cross-sectional view for describing a rear bumper storing apparatus in the related art.

It should be understood that the appended drawings are not necessarily to scale, presenting a somewhat simplified representation of various preferred features illustrative of the basic principles of the invention. The specific design features of the present invention as disclosed herein, including, for example, specific dimensions, orientations, locations, and shapes will be determined in part by the particular intended application and use environment.

In the figures, reference numbers refer to the same or equivalent parts of the present invention throughout the several figures of the drawing.

DETAILED DESCRIPTION

Reference will now be made in detail to various embodiments of the present invention(s), examples of which are illustrated in the accompanying drawings and described below. While the invention(s) will be described in conjunction with exemplary embodiments, it will be understood that present description is not intended to limit the invention(s) to those exemplary embodiments. On the contrary, the invention(s) is/are intended to cover not only the exemplary embodiments, but also various alternatives, modifications, equivalents and other embodiments, which may be included within the spirit and scope of the invention as defined by the appended claims.

The cargo loading apparatus of the luggage room according to various embodiments of the present invention is stored and kept in an internal space of a rear bumper 1 at ordinary times and drawn rearward from the rear bumper 1 while in use for loading a cargo, as illustrated in FIGS. 2 to 9.

That is, the cargo loading apparatus of the vehicle luggage room according to the present invention includes a rail mechanism 10 including a fixation rail 11 fixed to a rear back beam 4 and a movable rail 12 that moves forward and rearward along the fixation rail 11; a pair of left and right side plates 20 installed in parallel or substantially parallel in front and rear directions at left and right sides of the movable rail 12 and connected with the movable rail 12 through a connection bar 21 to move in the front and rear directions together with the movable rail 12; an upper plate 30 in which a rear lateral surface is rotatably connected with the side plate 20 through a hinge stopper 22 to be rotatable vertically or substantially perpendicularly to the side plate 20 and a rear end is connected with a bumper door 3; and a lifter 40 installed so that one end of which is connected to the side plate 20 and the other end of which is connected to the upper plate 30 and maintaining a rotational state of the upper plate 30 while the length is varied when the upper plate 30 rotates upward around the hinge stopper 22.

Figure 2:
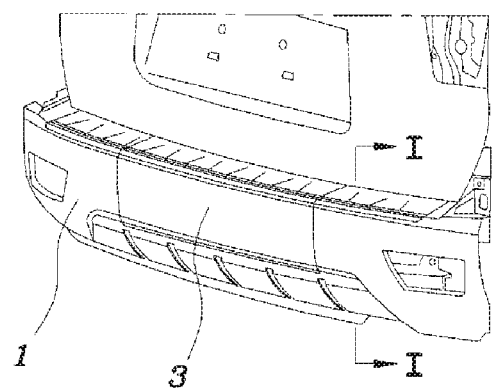
FIG. 2 is a rear perspective view of a vehicle including an exemplary cargo loading apparatus stored inside the rear bumper, illustrating a state in which a bumper door is installed at ordinary times according to the present invention.
Figure 3:
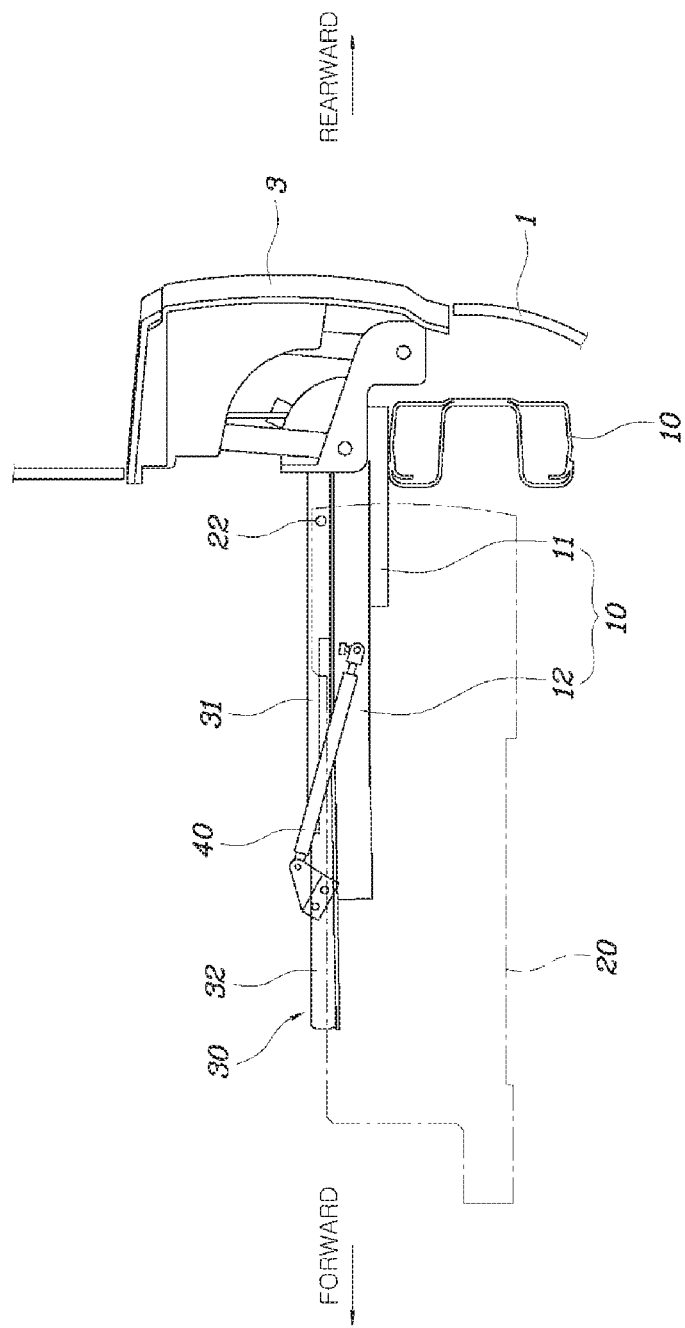
FIG. 3 is a cross-sectional view taken along the line I-I of FIG. 2, illustrating a state in which an exemplary cargo loading apparatus is stored in an internal space of a rear bumper according to the present invention.
Figure 4:
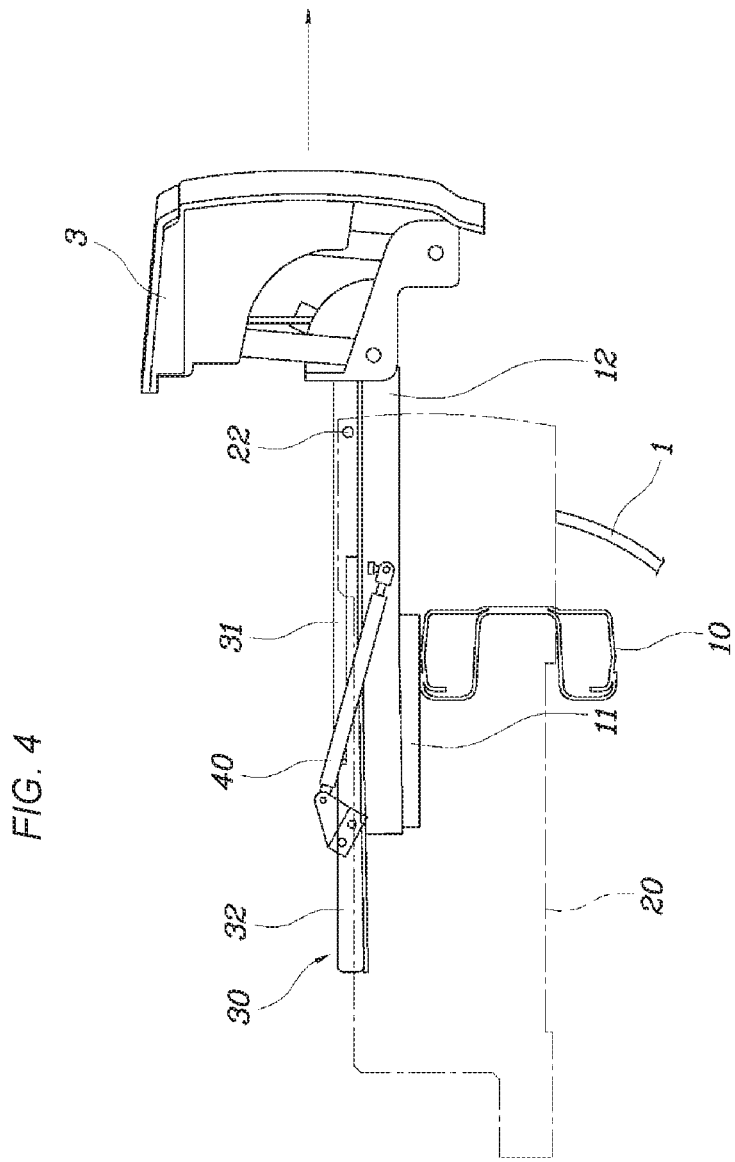
FIG. 4 is a view illustrating a state in which an exemplary cargo loading apparatus is drawn rearward from the rear bumper according to the present invention.

The bumper door 3 is configured to be separated from the rear bumper 1 by cutting a part of the rear bumper 1 and as illustrated in FIGS. 2 and 3, the bumper door 3 is formed coplanarly with the rear bumper 1 so as to perform a function of the rear bumper 1 at ordinary times without loading the cargo and the bumper door 3 is used by being drawn rearward from the rear bumper 1 as illustrated in FIG. 4 when being used for loading the cargo.

Further, the movable rail 12, and the side plate 20 and the upper plate 30 are stored in an internal space of the rear bumper 1 when the bumper door 3 performs a function of the rear bumper 1 at ordinary times and drawn rearward together when the bumper door 3 is drawn rearward from the rear bumper 1.

Accordingly, in case the user pulls and draws reward the bumper door 3 as illustrated in FIG. 4 in order to load a large-capacity cargo in the luggage room of the vehicle in the state at ordinary times when the bumper door 3 performs the function of the rear bumper 1 as illustrated in FIGS. 2 and 3, the movable rail 12, the side plate 20 and the upper plate 30 are drawn rearward together with the bumper door 3.

Figure 5:
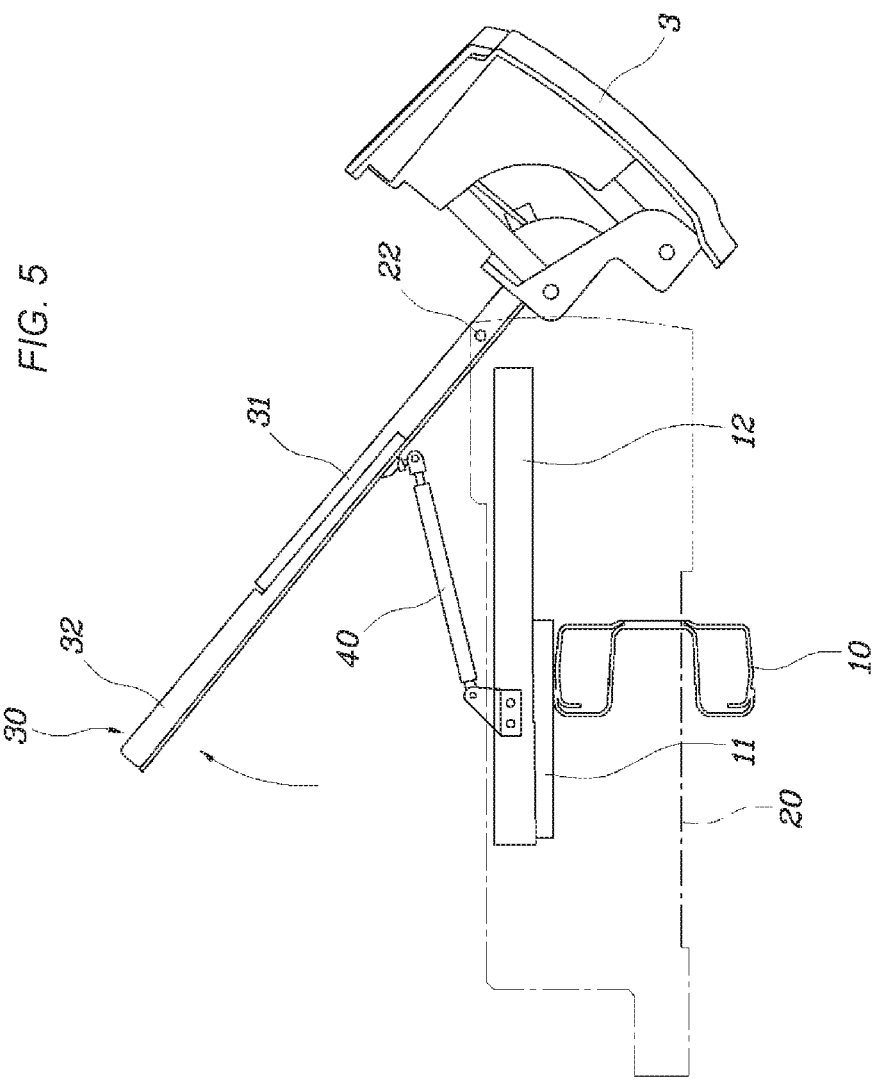
FIG. 5 is a view illustrating a state in which an exemplary cargo loading apparatus is tilted upward according to the present invention.

When the user presses the bumper door 3 downward to rotate the bumper door 3 as illustrated in FIG. 5 after drawing the bumper door 3 rearward as illustrated in FIG. 4, the upper plate 30 connected with the bumper door 3 rotates with a rear side moving down and a front side moving up around the hinge stopper 22.

In this case, a lifter 40 that connects the side plate 20 and the upper plate 30 stably supports the upper plate 30 which rotates while the length is increased with rotation of the upper plate 30, and as a result, the upper plate 30 continuously keeps a rotation state by supporting force of the lifter 40.

Meanwhile, the hinge stopper 22 may serve as a rotational center of the upper plate 30 and restrain the upper plate 30 at a maximum rotational angle of the upper plate 30. In addition, the lifter 40 may be any one of a gas lifter, a hydraulic lifter, and a pneumatic lifter, or the like.

Figure 6:
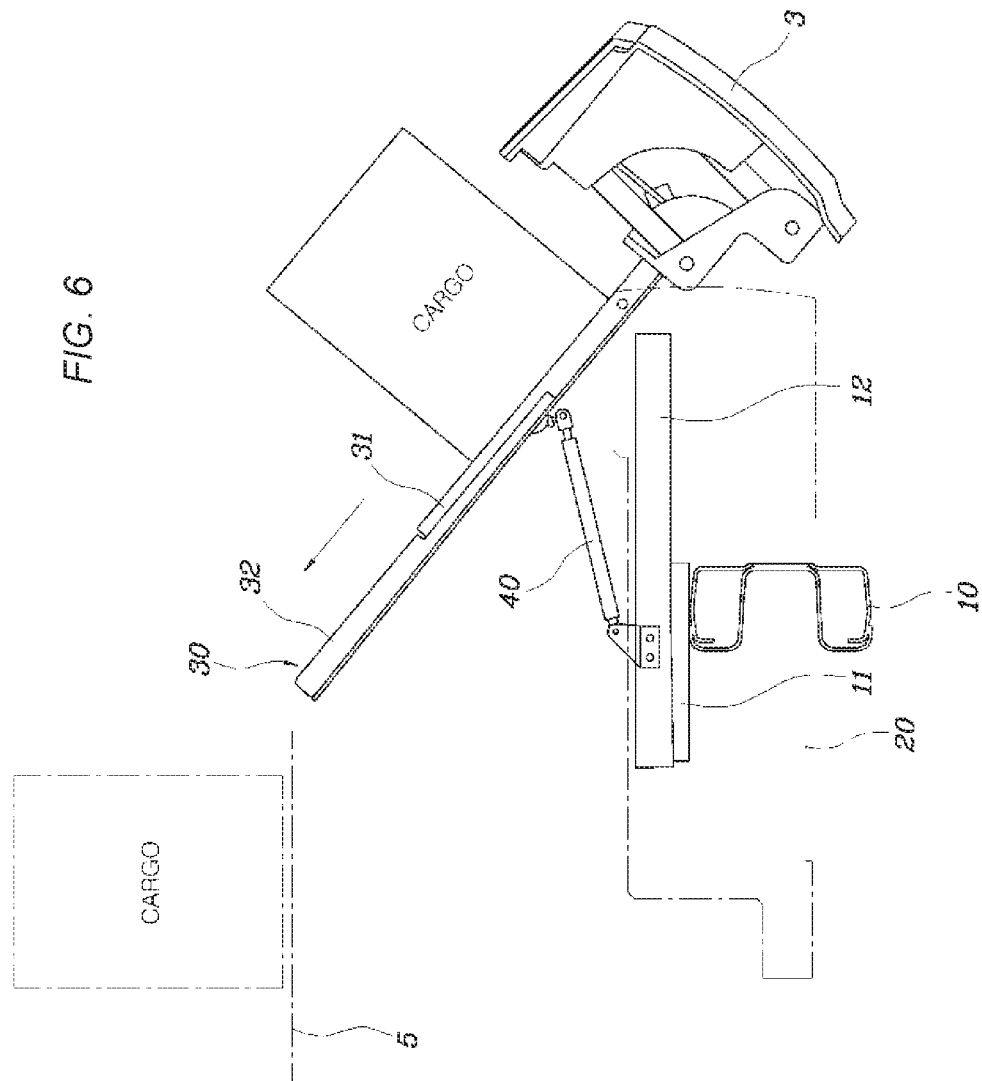
FIG. 6 is a view illustrating a state in which a cargo is loaded in the luggage room of the vehicle using an exemplary cargo loading apparatus tilted upward according to the present invention.
Figure 7:
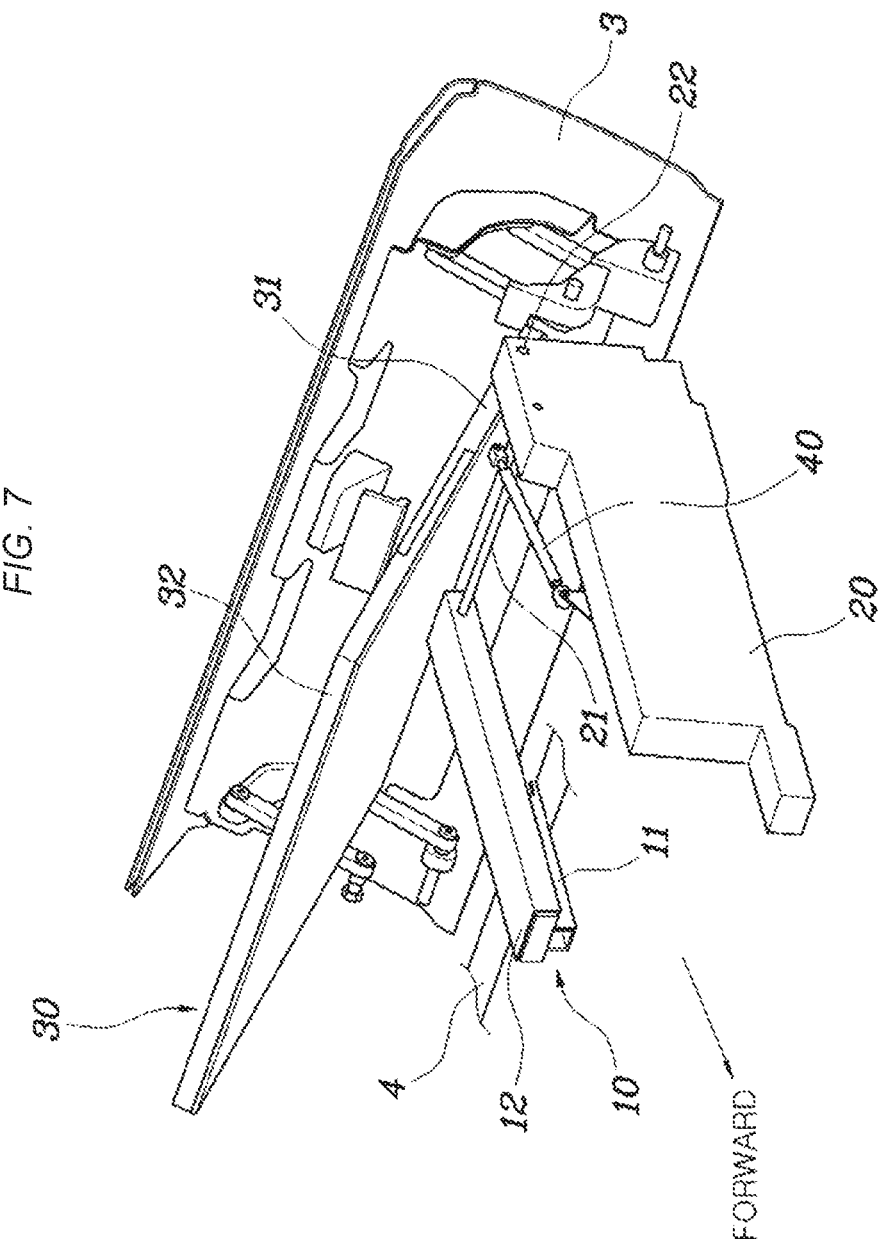
FIG. 7 is a perspective view of the state of FIG. 6.

After the upper plate 30 is rotated with a front portion of the upper plate 30 being lifted as illustrated in FIG. 5, a cargo to be loaded is laid on the upper plate 30 as illustrated in FIG. 6 and thereafter, pushed up to load the cargo in the luggage room 5 of the vehicle.

Accordingly, according to various embodiments of the present invention, as the user does not need to personally raise and load the cargo when loading a large-capacity cargo having a large volume and a heavy weight in the luggage room, user's convenience may be significantly improved and in particular, a woman driver or an old age driver may usefully use the cargo loading apparatus.

Meanwhile, according to various embodiments of the present invention, as a scheme for increasing the supporting force of the upper plate 30 for the weight of the cargo, the upper plate 30 may be separated into a rear plate 31 and a front plate 32 and a rotational state of the rear plate 31 may be supported using the front plate 32. That is, the upper plate 30 according to various embodiments of the present invention may include a rear plate 31 connected with the bumper door 3 and a front plate 32 connected with the rear plate 31 to be slide-movable and rotatable to the rear plate 31.

In this case, the top of the lifter 40 is connected to the front plate 31, and when the front plate 32 moves forward or rotates to the rear plate 31, the top of the lifter 40 is separated from the front plate 32.

Figure 9:
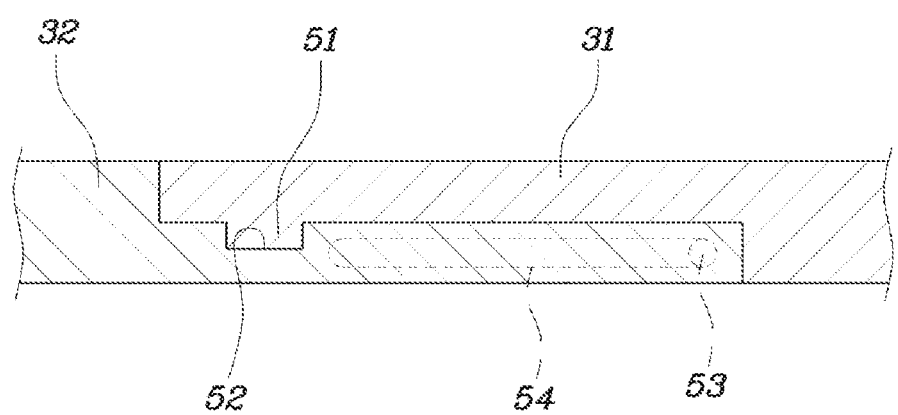
FIG. 9 is a cross-sectional view illustrating an exemplary structure for moving and rotating the front plate in an exemplary cargo loading apparatus according to the present invention.

In addition, if the upper plate 30 is separated into the rear plate 31 and the front plate 32, the rear plate 31 and the front plate 32 may move together when the upper plate 30 moves for rearward drawing and forward storing together with a bumper cover 3. Therefore, to this end, a joining protrusion 51 is provided on the rear plate 31 and a joining groove 52 into which the joining protrusion 51 is inserted is provided on the front plate 32 as illustrated in FIG. 9. In some embodiments, the joining groove 52 is provided on the rear plate 31 and the joining protrusion 51 is provided on the front plate 32.

As a structure in which the joining protrusion 51 and the joining groove 52 are engaged and joined separably from each other, additional or optional separable joining means may be used instead of the structure of the joining protrusion 51 and the joining groove 52.

Further, hinge protrusions 53 may be provided on both rear lateral surfaces of the front plate 32 for forward and rearward movement and rotation of the front plate 32 to the rear plate 31, and a guide groove 54 to which the hinge protrusion 53 may move in a longitudinal direction may be provided on the rear plate 31.

A rail structure may be used for the forward and rearward movement of the front plate 32 and in this case, an additional rotation structure needs to be provided for the rotation of the front plate 32.

Figure 8:
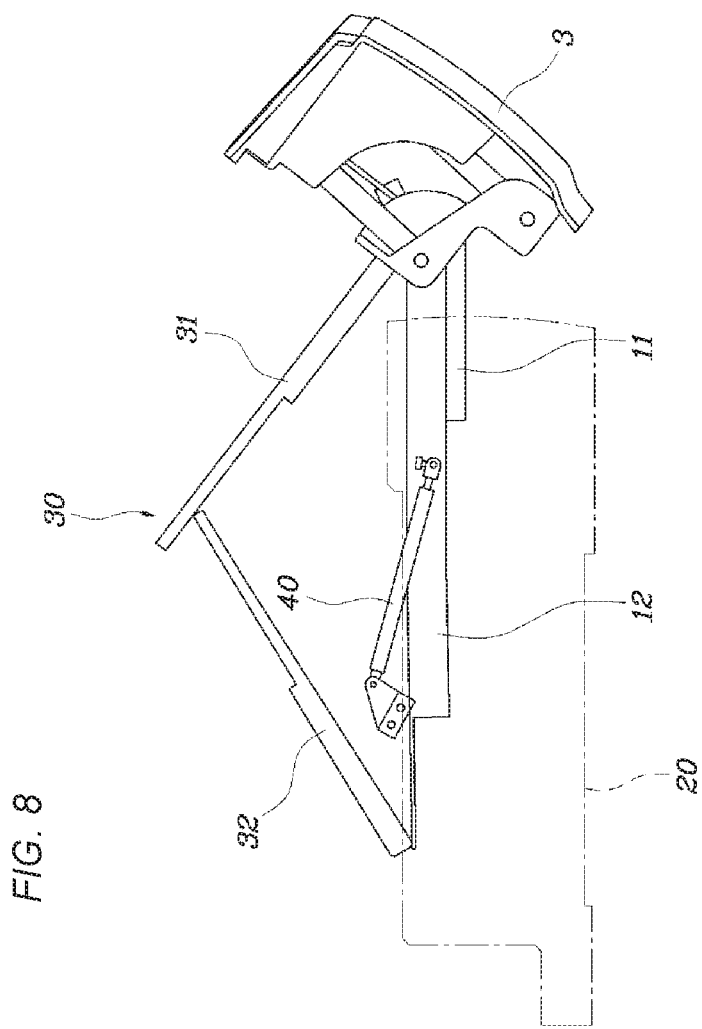
FIG. 8 is a view illustrating an exemplary structure for supporting a rear plate using a front plate in an exemplary cargo loading apparatus according to the present invention.

In addition, after a front end portion of the front plate 32 rotates or moves toward the side plate 20 as illustrated in FIG. 8, the front plate 32 fixes a front end portion of the front plate 32 onto the side plate 20 so as to easily support the rear plate 31.

As described above, according to various embodiments of the present invention, the user can load the cargo using a plate which is tilted upward after drawing the cargo rearward from the rear bumper 1 without directly raising and loading the cargo when loading the large-capacity cargo having the large volume and the heavy weight in the luggage room of the vehicle. As such, the cargo loading apparatus of the present invention significantly improves user's convenience and in particular, is useful to female drivers and seniors.

For convenience in explanation and accurate definition in the appended claims, the terms "front" or "rear", "left" or "right", and etc. are used to describe features of the exemplary embodiments with reference to the positions of such features as displayed in the figures.

The foregoing descriptions of specific exemplary embodiments of the present invention have been presented for purposes of illustration and description. They are not intended to be exhaustive or to limit the invention to the precise forms disclosed, and obviously many modifications and variations are possible in light of the above teachings. The exemplary embodiments were chosen and described in order to explain certain principles of the invention and their practical application, to thereby enable others skilled in the art to make and utilize various exemplary embodiments of the present invention, as well as various alternatives and modifications thereof. It is intended that the scope of the invention be defined by the Claims appended hereto and their equivalents.

What is claimed is:

1. A cargo loading apparatus of a vehicle luggage room, comprising:
   a rail mechanism including a fixation rail fixed to a rear back beam and a movable rail that moves forward and/or rearward along the fixation rail;
   a pair of left and right side plates connected with the movable rail to move together with the movable rail;
   an upper plate in which a rear side surface is rotatably connected with the side plates through a hinge stopper to be rotatable substantially perpendicularly to the side plates and a rear end is connected with a bumper door; and
   a lifter installed so that a first end of which is connected to at least one of the side plates and a second end of which is connected to the upper plate, the lifter maintaining a rotational state of the upper plate while a length of the lifter is varied when the upper plate rotates upward around the hinge stopper,
   wherein the upper plate includes:
   a rear plate connected with the bumper door; and
   a front plate coupled with the rear plate to be slidably-movable and rotatable with respect to the rear plate,
   wherein hinge protrusions are provided on rear lateral surfaces of the front plate for forward and rearward movement and rotation of the front plate with respect to the rear plate, and
   wherein the rear plate includes a guide groove into which at least one of the hinge protrusions is engaged, the at least one of the hinge protrusions moving in a longitudinal direction of the guide groove.

2. The apparatus of claim 1, wherein:
   the bumper door is configured to be separable from the rear bumper, and to be installed coplanarly with the rear bumper at ordinary times while not loading a cargo such that the bumper door and the rear bumper collectively performs a function of the rear bumper at the ordinary times.

3. The apparatus of claim 2, wherein:
   the movable rail, the side plates and the upper plate are stored in an internal space of the rear bumper when the bumper door performs a function of the rear bumper and are drawn rearward together when the bumper door is drawn rearward from the rear bumper.

4. The apparatus of claim 1, wherein:
   a top of the lifter is connected to the front plate.

5. The apparatus of claim 1, wherein:
   a joining protrusion is provided on any one of the rear plate and the front plate and a joining groove into which the joining protrusion is inserted is provided on the other one of the rear plate and the front plate so that the rear plate and the front plate move together when the upper plate moves for rearward drawing or forward storing, and the joining protrusion and the joining groove are detachably engaged and joined to each other.

6. The apparatus of claim 4, wherein:

the front plate moves forward from the rear plate after the top of the lifter is separated from the front plate.

7. The apparatus of claim 1, wherein:

a front end portion of the front plate rotates toward the side plates around the hinge protrusions and thereafter, is fixed to the side plates to support the rear plate.

* * * * *